Figure 1:
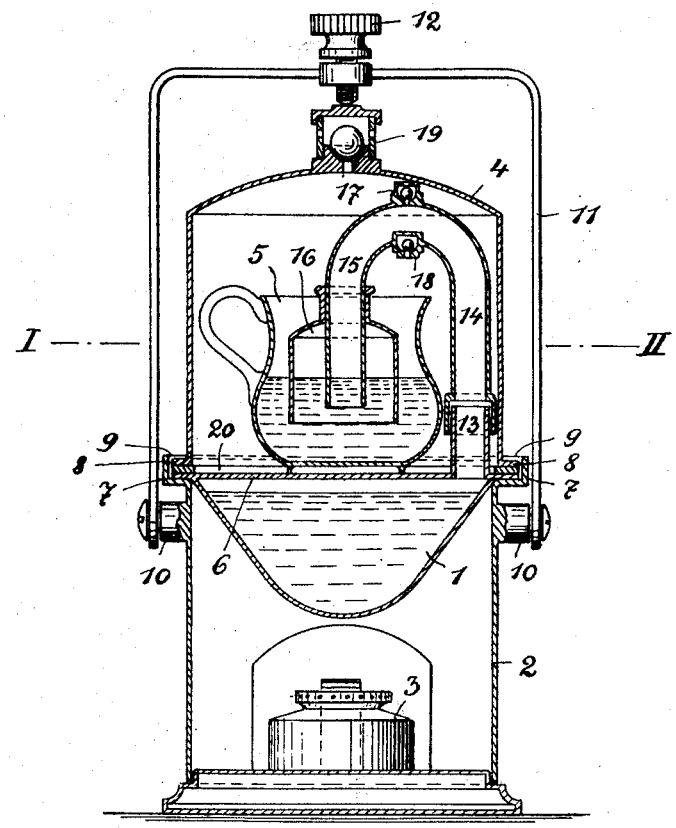

Dec. 29, 1925.                                                1,567,994
F. KESER
STEAM STERILIZING APPARATUS FOR DOMESTIC USE
Filed May 14, 1924

Witnesses:                                                   Inventor:

Patented Dec. 29, 1925.

UNITED STATES PATENT OFFICE.

FRITZ KESER, OF SCHOMBERG, GERMANY.

STEAM STERILIZING APPARATUS FOR DOMESTIC USE.

Application filed May 14, 1924. Serial No. 713,280.

*To all whom it may concern:*

Be it known that I, FRITZ KESER, a citizen of the German Republic, residing at Schomberg, Germany, have invented certain new and useful Improvements in steam sterilizing apparatus for domestic use, especially for disinfecting the sputum of lung-sick persons, of which the following is a specification.

This invention relates to an apparatus for sterilizing liquids, especially the sputum of tubercular persons, by means of steam injected into the liquids, said apparatus being especially designed for domestic use.

The method commonly used in households to empty the sputum into the water-closet presents considerable danger for the healthy members of the family, as the tubercle bacilli find in the water-closet a suitable culture medium and are capable of resisting decomposition for such a long time that even in clarification plants and on irrigation fields tubercle bacilli have been found which were still capable of living.

The numerous chemical means which have been suggested are proved either not reliable or too expensive for general use. Although hot steam is known to be the surest means, no apparatus exists at present using hot steam in households.

This invention has for its object to obviate this inconvenience by creating an apparatus which enables even unskilled persons to carry out the thorough disinfection of the sputum and of the vessel which contains the same. In order to prevent the conglobation of the sputum, whereby the sterilization is impeded, the main portion of the steam generated is conducted in the new apparatus directly into the mass of the sputum in such a manner that during the treatment the sputum is constantly maintained in bubbling movement.

The apparatus consists essentially of a small steam generator heated by a spirit lamp, a gas flame, or electrically, of a bell tightly fitted over said steam generator in which the sputum vessel is located, a ∩-shaped steam pipe starting from the steam generator and terminating in the sputum vessel, and a bell-shaped cup mounted over the orifice of this pipe.

The free end of the steam pipe plunges into the liquid to be disinfected. The bell-shaped cup movably mounted on this arm has to be adjusted so that its open lower end dips slightly deeper into the liquid than the pipe.

The steam which flows out at a pressure slightly above the atmospheric forces the liquid down in the arm of the tube so far that it can flow out under the lower edge of said tube. As the tubular cap on the end of the tube plunges more deeply into the liquid than the tube the steam ascending through the liquid collects first under this cap until the pressure is increased so much that it passes under the deeper edge of the cap to ascend through the liquid. The velocity of the hot steam is thus increased, the travel of the steam is lengthened and the steam is made to come in contact with all parts of the liquid. As the liquid is maintained in circulating movement the disinfecting effect is extraordinarily intense even if the quantity of steam is small.

The space around the sputum vessel under the outer bell is also rapidly heated by the steam rising from the vessel so that this vessel is strongly heated and disinfected from the inside and from the outside. In order to preliminarily heat the space under the outer bell at the beginning of the working period, before the sputum liquid is heated to boiling by the steam traversing the same, a small safety valve is preferably arranged on the steam pipe inside the outer bell, said safety valve being slightly lifted at the low steam pressure which is required for forcing the steam through the liquid. The flowing over of the disinfected liquid into the steam generator at the cooling of the apparatus is prevented by a check valve. In the upper part of the outer bell, which is air-tightly fixed over the steam generator in any convenient manner, a safety valve for the escape of the excess steam is arranged and loaded according to the pressure required for the working of the apparatus.

An embodiment of the invention is shown by way of example on the accompanying drawing, in which Fig. 1 shows the apparatus in axial vertical section, a sputum vessel being inserted for disinfection.

Figure 2:
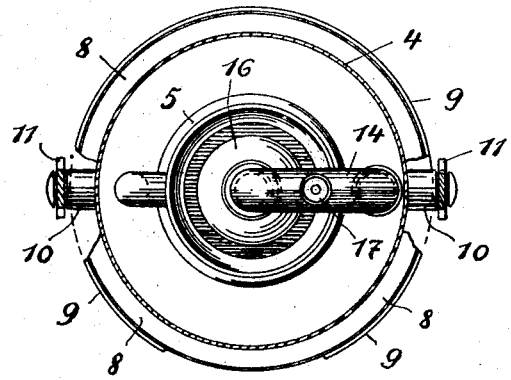

Fig. 2 is a horizontal section on the dotted line I—II of Fig. 1.

Referring to the drawing, 1 is a boiler mounted on a cylindrical base 2 in which a small spirit lamp 3 of convenient construction is arranged as source of heat. 4 is a removable bell for the reception of the spittoon 5 to be disinfected. The boiler 1, which at the lower end is spherical and has a flat top plate 6, rests with the edge 7 of the flat top plate on the outwardly flanged edge 9 of the base part 2. On the flange 9 the bell 4 rests with its flange 8. The bell 4 is secured in position by means of a pressure screw 12 fixed in a bow 11 pivotable around laterally projecting studs 10 of the base part 2.

In the top plate 6 of the boiler 1 a tubular socket 13 is mounted at one side. Over this tubular socket 13 a ∩-shaped steam pipe 14 is mounted the free arm 15 of which extends downwardly at the centre of the bell 4. On this arm 15 a bell-shaped sleeve 16 is mounted by means of a suitable packing so that it can be adjusted in vertical direction. In the curved part of the tube 14 a small safety valve 17 is arranged and below the same a small check valve 18, the bell 4 carrying on its top a safety valve 19 of slightly greater dimension than the safety valve 17.

After the boiler 1 has been filled with water through the tubular socket 13 the spittoon 5 with the sputum is placed upon the top plate 6 of boiler 1, whereupon the steam tube 14 is mounted on the tubular socket 13 so that the end of arm 15 of the steam tube plunges for a short distance into the liquid to be disinfected. The bell-shaped sleeve 16 is adjusted in its position on arm 15 so that it plunges with its lower end into the liquid for a greater depth than the end of arm 15 of the steam tube.

The bell 4 is placed over the spittoon and tightly pressed upon a packing ring 20 on the flange 7 of the boiler through the action of the pressure screw 12. The spirit lamp 3 in the base part 2 is lighted and the working of the disinfecting apparatus begins.

I claim:—

A sterilizing hot steam apparatus for household use especially designed for disinfecting the sputum of tubercular persons said sputum being contained in a separate vessel, comprising in combination a steam generator on the centre of the top of which said sputum-containing vessel is to be placed, a tubular outflow socket eccentrically mounted in the top plate of said steam generator, a ∩-shaped steam tube pivotally mounted on said tubular outflow socket so that its free end may be made to engage with said sputum-containing vessel to dip into the sputum, a bell-shaped sleeve adjustably mounted on the free end of said steam tube so that it can be made to dip into the sputum for a greater depth than the end of said steam tube to ensure an intimate admixing of steam and liquid, and a check valve in said steam tube designed to ensure an equalization of pressure in the steam tube when the apparatus is getting cool and to prevent thus the rising of the liquid in said steam tube.

In testimony whereof I affix my signature.

FRITZ KESER.